United States Patent [19]
Molenaar

[11] 3,909,872
[45] Oct. 7, 1975

[54] WINDSHIELD WASHER PUMP

[76] Inventor: Henri Charles Molenaar, Stevinstraat 177, Den Haag, Netherlands

[22] Filed: Dec. 10, 1973

[21] Appl. No.: 423,643

[52] U.S. Cl. ............ 15/250.02; 200/4; 200/61.86; 417/328; 417/402
[51] Int. Cl.² .................. B60S 1/46; F04B 17/00
[58] Field of Search ....... 15/250.01, 250.02, 250.12, 15/250.16; 417/375, 392, 402, 328; 200/61.86, 4

[56] References Cited
UNITED STATES PATENTS

| | | | |
|---|---|---|---|
| 2,828,694 | 4/1958 | Nallinger | 417/392 X |
| 2,992,448 | 7/1961 | Simpson | 15/250.02 |
| 3,039,127 | 6/1962 | Molenaar | 15/250.02 |
| 3,097,608 | 7/1963 | Deibel et al. | 417/375 |
| 3,227,817 | 1/1966 | Ogren | 15/250.02 X |
| 3,425,088 | 2/1969 | Molenaar | 15/250.02 |
| 3,445,881 | 5/1969 | Molenaar | 15/250.02 |

FOREIGN PATENTS OR APPLICATIONS

| | | | |
|---|---|---|---|
| 1,120,569 | 7/1968 | United Kingdom | 200/61.86 |

Primary Examiner—Peter Feldman
Attorney, Agent, or Firm—Robert R. Priddy

[57] ABSTRACT

The invention relates to windshield washer pumps of the type in which washing fluid is drawn into the pump by a vacuum-driven reciprocating pump member. The invention pertains to various aspects of such devices, including systems with check-valve controlled suction ducts, systems with switching arrangements for control of the starting and stopping of windshield wipers, systems with ambient air inlet valve means for admitting ambient air to the pumping chamber, the size relationship of the check valve means and ambient air inlet valve means of such systems, systems in which the switching means and ambient air inlet valve means are either combined or separate, the arrangement of a thrust bearing provided for transmission of force between the switching means and valve means, systems in which there is remote-control inter-connection between the pump and the switching means, which is mounted in a vehicle instrument panel, and systems with provision for adjustable delayed shut-off of windshield wipers after pumping of washing fluid onto the windshield has ceased.

28 Claims, 10 Drawing Figures

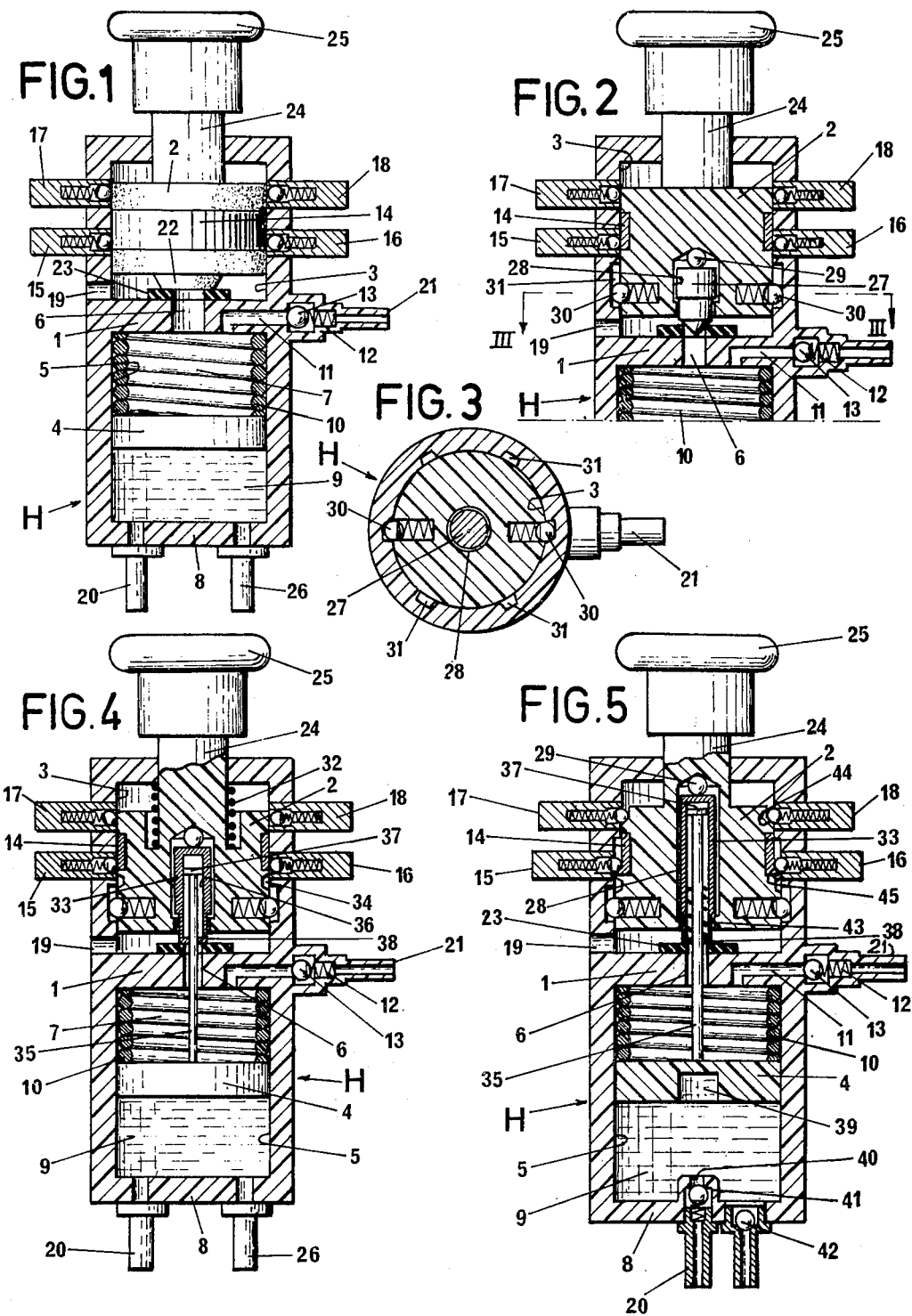

WINDSHIELD WASHER PUMP

BACKGROUND OF THE INVENTION

Although considerable work has been done in the past on windshield washer pumps, both by the present applicant and others, there remains a need for improved pumps. Among these are the need for pumps with relatively simple, trouble-free drawing and discharging arrangements, which can store a quantity of washing fluid. Particularly, the present applicant has perceived a need for such devices in which stored fluid is unaffected by the usual changes in the suction available from the intake manifold of a vehicle engine as it accelerates and decelerates. Devices fulfilling this need have the further advantage that they may retain their "prime" — at least for moderate periods — while the engine is off. The present applicant has also perceived a need for devices in which there are both an ambient air inlet valve and switch means associated with the pump, and in which the ambient air inlet duct is arranged in an improved manner for facilitating operation of the pump and for avoiding fouling of the switch contacts.

SUMMARY OF THE INVENTION

A first aspect of the present invention is directed to a windshield washer pump having a check-valve controlled suction duct suitable for connecting said pump to a vacuum source. This source may for instance be the intake manifold of an internal combustion engine. The pump includes a closed chamber having a pumping member. The latter divides said chamber into first and second portions and is moveable in said chamber for drawing washing liquid into and discharging the liquid from the first portion thereof. The suction duct connects with the interior of the second portion of the chamber for reducing the pressure therein and for actuating the pumping member to draw in and maintain some washing liquid in said second portion. The aforementioned check valve communicates between the suction duct and the interior of the second chamber and has open and closed positions, as well as closing means which urges said check valve into closed position in response to increase of absolute pressure in the suction duct as compared to the absolute pressure in the second portion of the pumping chamber. Thus, washing fluid may be maintained in said pump despite fluctuations in available vacuum.

Devices of the type discussed herein may employ a piston, diaphragm or other means as the pumping member, and may be assisted during the discharge stroke by a spring or other discharge urging means. This would include for instance a number which exerts force continuously upon the pumping member when the first portion of the chamber is filled with washing fluid, or a member which exerts force continuously upon the pumping member in all positions to which it is moveable, but most preferably a spring positioned to be compressed by the pumping member as it moves to draw in washing liquid.

According to a preferred embodiment, the device includes an ambient air inlet and inlet valve means communicating between the interior of the second portion of the pumping chamber and the exterior of said chamber for controllably admitting air to the second portion of the chamber. Particularly good results are obtained when the suction duct and check valve means have a greater combined resistance to the flow of air out of the second portion of the pumping chamber than the combined resistance which the ambient air inlet and inlet valve means have to the flow of air into the second portion of the chamber.

Generally speaking, a device embodying a combination of certain preferred features of the invention is constructed and operates in a manner partly similar to known devices. For instance, it is known to use a suction duct which communicates with the interior of the second portion of the pumping chamber for exhaustion of air therefrom thereby to reduce the pressure therein, to produce a differential pressure on opposite sides of the pumping member and to actuate the pumping member for drawing in and maintaining the liquid in said second portion while the ambient air inlet valve is in closed position. The discharge urging means is connected with the pumping member in a known manner for exerting force thereon continuously in the direction of movement corresponding to discharge of fluid, and the pumping member is engaged with wall means defining said chamber for retaining said differential pressure and restraining the pumping member against its discharging movement until the ambient air inlet valve means is opened. The check valve provided in accordance with the present invention communicates between the suction duct and the interior of the second chamber, and has open and closed positions. The check valve further includes closing means for urging the check valve into closed position in response to increase of absolute pressure in the suction duct relative to the absolute pressure in the second portion of the chamber, thereby to restrict loss of fluid from said first chamber when the engine intake manifold pressure fluctuates. Because the check valve and suction duct have a greater combined resistance to the flow of air out of said second chamber than the combined resistance of the ambient air inlet and inlet valve means have to the flow of air into the second portion, the entry of ambient air and the discharge motion of said pumping member are facilitated. In a preferred automatic version of the pump, there are means interconnecting the pumping member with said ambient air inlet valve for closing said valve when the discharge motion of said pumping member is substantially complete.

In accordance with another aspect of the invention, there is provided a suction operated windshield washer pump having a pumping chamber with an ambient air inlet valve means and a manual outward-pulling operating handle means. The latter is connected to said valve means through a windshield wiper operating switch. In accordance with preceding embodiments, the pump includes a closed chamber having a pumping member dividing said chamber into first and second portions and moveable in said chamber for drawing and discharging liquid. There is also, as before, a suction duct connecting with the interior of the second portion of the chamber for reducing the pressure therein and for actuating the pumping member to draw in the liquid into said second portion and wall means defining an enclosure for said switch means. However, according to this aspect of the invention, there is an ambient air inlet duct, controlled by said ambient air inlet valve means, connecting between the interior of the second portion of said chamber and the exterior thereof by a path which does not extend through said switch means.

Preferred embodiments of the second aspect of the invention may include check valve means controlling the suction duct and the particular kinds of pumping members and discharge urging means described in connection with the first aspect of the invention. Further preferred embodiments of the second aspect include devices wherein the ambient air inlet valve means is positioned at the opposite end of the windshield wiper switch means from the manual operating handle means. In such case, the body of said windshield wiper switch means and said ambient air inlet valve means may be a unitary assembly or may include a rotary connection between the switch body and the ambient air inlet valve means whereby the switch body may be rotated independently of said valve means. This makes feasible a construction wherein the manual operating handle means has longitudinally inward and outward positions for actuating both the pump and the windshield wiper switch means, as well as a plurality of rotational positions for operating only the windshield wiper switch means.

Automatic shut-off of the wipers may be achieved when the windshield wiper operating switch means has a lost motion connection with said pumping member. Savings in space behind the automobile instrument panel may be gained by placing the windshield wiper operating switch means and the pumping member in separate housings and interconnecting them by cable means. If the ambient air inlet valve means is in the same housing with the windshield wiper operating means, the aforementioned separate housings may be interconnected by a vacuum tube.

According to a third aspect of the invention, there is provided an improved suction-operated windshield washer pump of the type which includes in its housing windshield wiper switch means and ambient air inlet valve means. In accordance with the invention, such device has a manual operating handle means or knob with longitudinally inward and outward positions for actuating said pump and said windshield wiper switch means and a plurality of rotational positions for operating only said windshield wiper switch means. Preferably, a ball is confined between the ambient air inlet valve means and either the windshield wiper switch body or the handle means. It acts as a thrust bearing for closing the valve and for maintaining a stationary seal between the valve and its seat even when the switch body is rotated about its axis. Most preferably, both the ball and the valve means are rotatably mounted in a bore which may extend into the windshield wiper switch body or even into the handle means. This provides a compact assembly while simplifying confinement of the ball and valve. The valve member itself may include an axial bore opening in the direction of the valve seat for confinement of means interconnecting the valve with a pumping member. This provides a convenient basis for automatic closure of the valve as the pumping member reaches substantially the end of its discharge stroke.

BRIEF DESCRIPTION OF THE DRAWINGS

In order that the invention may be more clearly understood, various embodiments will be described in detail in the accompanying drawings, wherein:

FIG. 1 is an axial section of one embodiment;

FIG. 2 is an axial section of part of a second embodiment;

FIG. 3 is a cross section taken along line III—III of FIG. 2;

FIG. 4 is a section, corresponding with FIG. 1, of a third embodiment, and

FIG. 5 is an axial section of a fourth embodiment of the pump in accordance with the invention;

In the FIGS. 1–5 and 6–9 respectively, corresponding parts are indicated by like reference numbers.

VARIOUS PREFERRED EMBODIMENTS

Figure 6:
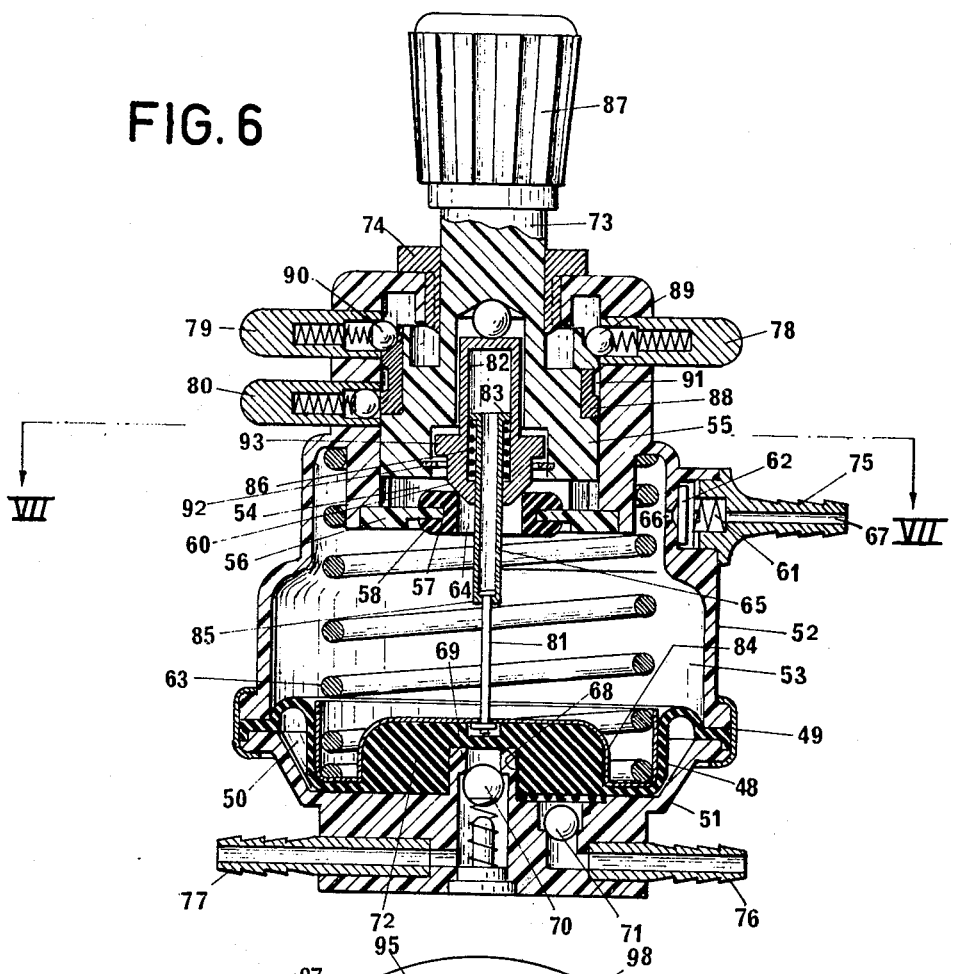
FIG. 6 is an axial section of a preferred embodiment.
Figure 8:
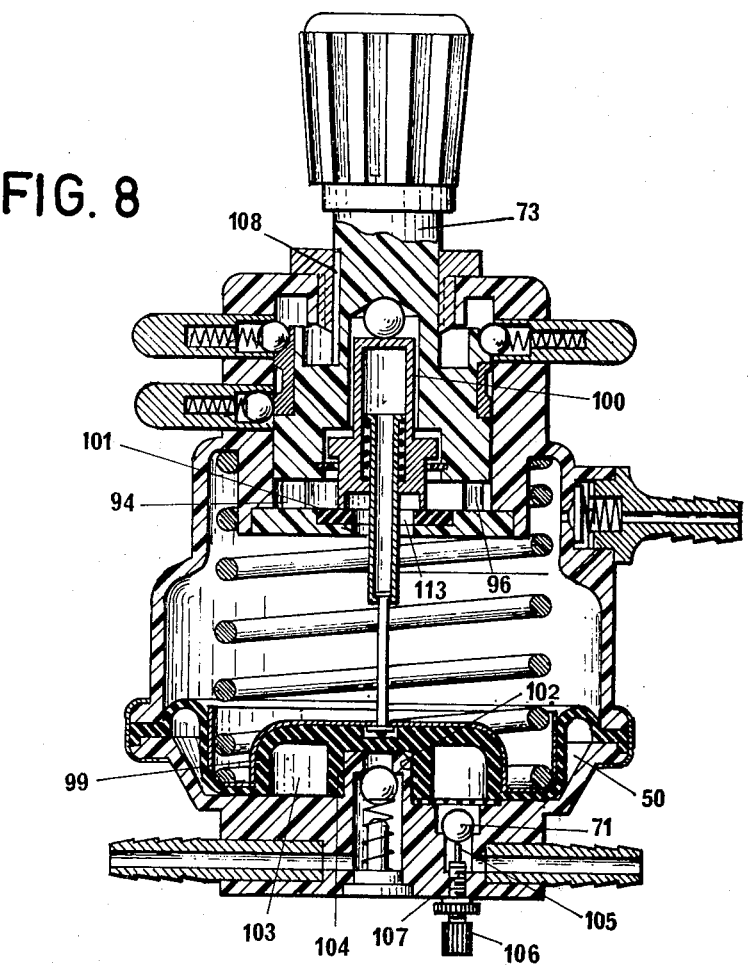
FIG. 8 is an embodiment corresponding with FIG. 6.

FIGS. 1 to 5 show the pump in "primed" position, i.e. the position in which the spring, or other discharge urging means connected to the pumping member, is under compression. FIGS. 6 and 8 show the pumping member as having completed its discharge stroke. The cylindrical pump housing H in FIGS. 1 to 5 is composed of electrically insulating material, e.g. plastic, and is divided by a partition 1. It includes a cylindrical space with inner wall 3 containing a switch body 2 of electrically insulating material. The housing also includes a cylindrical closed chamber with inner wall 5 containing a pumping member 4, e.g. a piston. The closed chamber has a first portion 9, a space between pumping member 4 and housing bottom 8, and a second portion 7, a space between pumping member 4 and partition 1. Partition 1 has a coaxial duct 6 connecting space 3 with second portion 7 of the pumping chamber.

In the pump shown in FIGS. 1–5, space 7 contains a compression spring 10 for effecting the discharge stroke of pumping member 4. This spring can be compressed during the suction stroke of the pumping member, or could be arranged to be stretched if located in space 9. The pumping member 4 can be driven in its suction stroke by suction or vacuum from a source of sub-atmospheric pressure, e.g. the intake manifold of an automobile engine. To achieve this, a check-valve controlled duct 11 connects space 7 with the source of subatmospheric pressure. The check valve includes a control spring 12, a ball 13 and a nipple 21 which is in open communication with the inlet manifold. The spring 12 acts as a closing means for urging the check valve into closed position in response to increase of absolute pressure in the nipple 21, vacuum line and inlet manifold.

Switch body 2 carries a switching element 14 of electrically conductive material. Depending on the position of switch body 2, element 14 electrically connects either terminals 15 and 16, cutting the electric connection between terminals 17 and 18, vice versa. In the illustrated position of switching element 14, the circuit between terminals 15 and 16 is closed and the circuit between terminals 17 and 18 is open. The shape of switching element 14 will be determined by the wiring arrangement of the electric motor driving the windshield wipers. Each of the terminals 15–18 has an axial bore wherein a spring-loaded contact ball is slidingly confined.

In the embodiments of FIGS. 1–5 there is a connection between spaces 3 and 7 via axial duct 6 in partition 1, when switch body 2 moves axially from the illustrated position. The ambient atmosphere, e.g. air, can then enter via opening 19 in the wall of space 3. The resistance against air flowing through opening 19, the space between the switch body 2 and partition 1, and the coaxial duct 6, whereby air enters second portion 7, is lower than the resistance against air flowing through duct 11, the chamber containing valve 13, the bore of nipple 21 and the connection between nipple 21 and the intake manifold, whereby air is withdrawn from second portion 7. Thus, the case with which air enters second portion 7 will amply exceed the ease of withdrawal of air via duct 11 and check valve 13. Accordingly, the absolute pressure in space 7 will increase, releasing spring 10 and causing pumping member 4 to execute its discharge stroke. Pumping member 4 then forces the washing liquid in the first portion 9 of the chamber via nipple 20 of the pumping chamber outlet valve to the nozzle or nozzles fitted in front of the automobile windshield.

In the embodiments of FIGS. 1–5, the opening and closing of duct 6 is controlled by an ambient air inlet valve 22, 27 or 33 (respectively in FIG. 1, FIG. 2 and FIGS. 4, 5). In FIG. 1 this valve and the body 2 of the switch are a single piece of the material. Said valve cooperates with an annular valve seat 23 of suitable material such as rubber or a soft plastic material for keeping duct 6 closed. When the switch body 2 is moved axially from the illustrated position, such as by a rod 24 on switch body 2 projecting from pump housing H and carrying a control knob 25, the pump will begin to feed washing liquid to the nozzles mounted in front of the windshield. At the same time, however, the electric circuit between terminals 15 and 16 is broken and an electric circuit between terminals 17 and 18 is closed, whereby the windshield wipers are put into operation. On switch body 2 moving back to its initial position, i.e. the position in which valve 22 (FIG. 1) is closed again, the electric circuit between terminals 17 and 18 is broken and the electric circuit between terminals 15 and 16 is closed again, whereby the windshield wiper motor is caused to return the windshield wipers to their parking position and is subsequently disengaged. In the meantime the absolute pressure in space 7 again decreases causing pumping member 4 to execute its suction stroke and draw in a fresh quantity of washing liquid into the first portion 9 of the pumping chamber via nipple 26 of its inlet valve. The pump is then ready for further operation as and when necessary.

The pump in FIG. 2 differs from the one in FIG. 1 in that the switch body 2 can be turned about its axis without opening valve 27 or otherwise adversely affecting the seal of this valve. In this embodiment, switch element 14 is constructed so that when the switch body 2 is turned by means of knob 25, it first closes an electric circuit, causing the windshield wipers to move at one speed. On further rotation of switch body 2, it closes a second electric circuit, causing the windshield wipers to move at a different speed, which may be higher or lower than the first speed. In this embodiment of the pump one can therefore combine the functions of a conventional control switch for the windshield wiper motor and an automatic control of said motor coordinated with the pumping of washing fluid.

Ambient air inlet valve 27 is confined in a coaxial bore 28 of switch body 2. A ball 29, also confined in this bore between the switch body and valve 27 functions as a thrust bearing, for transmitting force to valve 27 for closing it and holding it closed even when the switch body is rotated about its axis. So that switch body 2 will assume and remain in the desired positions on rotation, it has two diametrically opposed radial bores, each containing a spring-loaded ball 30. As switch body 2 is rotated, balls 30 snap successively in diametrically opposed axial grooves 31, located pairwise in the inner wall of space 3 of pump housing H.

In the pump represented in FIG. 4, the switch body 2 is loaded by compression spring 32 fitted around control rod 24 in the pump housing. This spring tends to keep valve 33 closed. Switch body 2 can be retained in a position which keeps valve 33 open, by the balls of terminals 15 and 16 which engage the pair of diametrically opposed circumferential grooves 34 in switch body 2, against the action of compression spring 32. With valve 33 open and pumping member 4 nearing the end of its discharge stroke, switch body 2 is disengaged by a rod 35. It moves in unison with pumping member 4 and extends via duct 6 into coaxial bore 36 of valve 33. A boss 37 at the end of the the rod 35 closes valve 33 when pumping member 4 is at or near the end of its discharge stroke, since the boss 37 is positioned to abut against a stop member 38 on valve 33. As soon as the switch body 2 is released, spring 32 returns it to its initial position with a snapping action. Thus, valve 33 is closed again and pumping member 4 executes another suction stroke, so that the pump is ready for further operation.

With a pump like that in FIG. 4, one need not manually turn off the windshield wipers after the pump has stopped squirting washing liquid on to the windshield as the pump will do this automatically.

The pump shown in FIG. 5 also turns off the windshield wiper motor, but in this case provides a time interval of windshield wiper operation after the washing liquid has stopped discharging through the nozzles. Thus, the windshield wipers make a few strokes after the washing fluid has stopped and dry the windshield before returning to their parking position. To provide this time interval, the side of pumping member 4 which faces pumping chamber 9 is provided with a coaxial recess 39. It cooperates, when pumping member 4 nears the end of its discharge stroke, with a coaxial projection 41 of bottom wall 8 of the pumping chamber 9. This projection contains the washing fluid outlet opening 40 of said chamber. When recess 39 and projection 41 commence to cooperate, e.g. in the manner of a slide valve, the supply of washing liquid to the nozzles is cut off. At that moment valve 33 is not yet closed. Thus the electric circuit between terminals 17 and 18 is still closed and the windshield wiper motor is still operating. In this embodiment the pump's washing fluid intake valve 42 is constructed to permit restricted discharge of washing liquid, and a small quantity of it consequently flows back to the receptacle. Thus, even though outlet 40 is closed, pumping member 4 can, at considerably reduced speed, complete its discharge stroke. During this retarded movement of the pumping member a compression spring 43 fitted between stop member 38 of valve 33 and boss 37 of rod 35 is compressed. As soon as this spring 43 is fully compressed, the force of spring 10 is transmitted to valve 33 and thence to switch body 2. This overcomes the locking action exerted on switch body 2 by the balls of terminals 15 and 16. Spring 43 and body 2 return with a snapping action to the position in which valve 33 closes duct 6, and vacuum again builds up in chamber 7.

To operate the pump, the driver of an automobile equipped therewith pulls lightly outwardly on control knob 25, which will normally be in the front of the instrument panel, within his reach. Piston 4 and valve 33 have a lost motion connection between them via rod 35. Thus, the resistance to be overcome when starting the pump can be limited to the axial displacement resistance of switch body 2 resulting from the contact balls of terminals 15–18 being spring-biased against bevelled surfaces 44 and 45 of switch body 2 and/or its switching element 14. When the knob 25 is pulled to the "on" position, these balls snap into a circumferential groove adjacent and below the bevelled surface 45 of the switching element 14 and/or of body 2 of the switch. The latter groove corresponds with groove 34 (FIG. 4). The spring-loaded contact balls of terminals 15–18 cooperate with bevelled surfaces 44 and 45 to provide a snap-action closing of duct 6 by valve 33. Accordingly, these springs can perform the function of — and thus permit elimination of — compression spring 32 (FIG. 4) and thus eliminate one source of frictional drag on rotation of switch body 2. The various embodiments of FIGS. 6–10 operate in a manner similar to that of FIG. 5.

Figure 7:
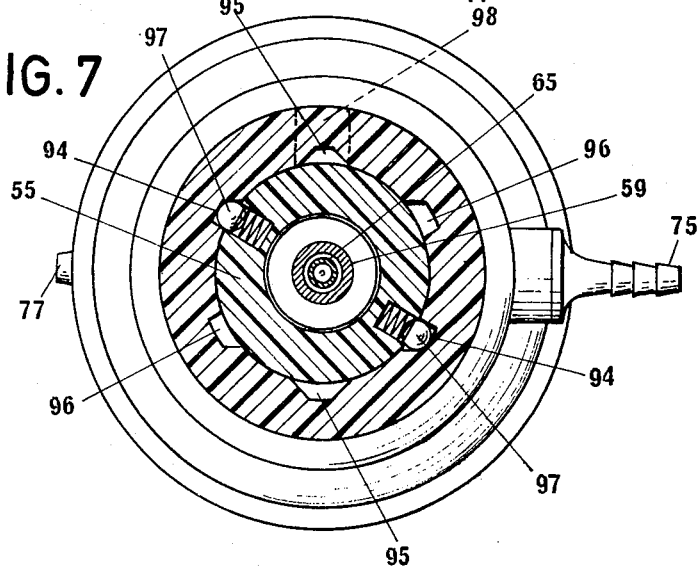
FIG. 7 is a radial section taken along line VII—VII of FIG. 6.

In FIGS. 6 and 7 the pumping member is a diaphragm 48. It is clamped along its periphery by strap 49 between a part 51 of the pump housing defining a first portion 50 of the pumping chamber, and a part 52 of the pump housing defining a second portion 53 of the pumping chamber which is traversed during its pumping stroke. The portion 53 of the pump housing is separated from the space 54 which contains switch body 55 by partition 56. In a coaxial opening 57 of partition 56 is fixed a socket 58 of flexible material, such as rubber. It is the seat of a freely rotatable valve 59 (FIG. 7) rotatably confined in switch body 55 but moveable axially in unison with the switch body, for admitting ambient air to second portion 53 of the pump housing. Part 60 of valve 59 cooperates with socket 58 and is cone-shaped. This facilitates effective sealing between part 60 and seat 58 when the valve is closed.

Space 53 can be brought into open communication with a source of suction (not shown), such as the intake manifold of an automobile engine, via the check valve 62, which is spring-biased towards its closed position by spring 61.

According to a preferred embodiment, the pump shown in FIG. 6 and 7 is constructed so that the check valve need not be closed in a positive manner during the discharge stroke of pumping member 48. In order to utilize, as fully as is necessary or desirable, the effect of spring 63, the air flow resistance of the path into space 53 via valve 59 is made lower than that of the path between space 53 and the suction source via check valve 62. Thus, the device may be provided with a path (not shown) corresponding with opening 19 in FIGS. 1–5 which passes through the wall of part 52 from space 54 to the outside of the device, as well as through the central opening 64 of socket 58, the latter being diminished in this case by the cross section of part 65 extending through opening 64. The last-mentioned path, which admits ambient air, will have a significantly larger cross-section than either the opening 66 which is controlled by check valve 62 or the bore of duct 67 connecting space 53 with the vacuum source. Preferably, the minimum cross sectional area at any point along the ambient air inlet path is a multiple of the minimum cross-sectional area at any point along the suction path.

As in FIG. 5, the pumping member formed by diaphragm 48 of FIGS. 6 and 7 has on it a coaxial recess 68. It cooperates with coaxial projection 69 of the bottom wall of the pumping chamber, which projection contains discharge valve 70. As a result of the cooperation between recess 68 and projection 69, the delivery of washing liquid to the windshield is interrupted. However, diaphragm 48 can still complete its discharge stroke because inlet valve 71 does not seal tight, against its seat, and thus permits restricted passage of the remaining washing liquid in the pumping chamber back to the supply container for such liquid.

In order that the dimensions of recess 68 will increase as little as possible in a radial direction when diaphragm 48 stretches during its discharge stroke, the central part 72 of the diaphragm can be formed with a larger thickness than the length of recess 68.

The pump can be installed in an opening in an automobile instrument panel by means of a bored bolt 74. It may also serve as a guide for pump control rod 73. Connecting nipple 76 of inlet valve 71 of pumping chamber 50 is connected to a receptacle for a stock of washing liquid by means of a tube, which opens up below the level of the washing liquid. Connecting nipple 77 of outlet valve 70 of pumping chamber 50 is connected to the nozzles fitted in front of the windshield of the automobile by means of a tube, if necessary with the aid of a tee fitting. Terminals 78, 79 and 80 area appropriately connected to the terminals of the electric motor for driving the windshield wipers.

As soon as the engine of the automobile is started, the suction generated in its intake manifold reduces the absolute pressure in space 53. Accordingly, diaphragm 48 executes its suction stroke against the action of spring 63, drawing washing liquid into the first portion of the pumping chamber. The suction stroke of diaphragm 42 progresses until spring 63 is fully compressed.

To reduce the overall length of the pump in the direction in which the pumping member moves, the rod extending from the pumping member into the bore of the ambient air inlet valve 59 may be constructed in two parts connected telescopically. A rod 81 moving in unison with the diaphragm is telescopically connected to a socket tube 65 extending into the bore 32 of valve 59. Socket tube 65 is provided with boss 83 at its open end. Tube 65 is slidably supported in the coaxial bore 82 of valve 59 and starts to follow the upward movement of the diaphragm only when spring cup 84 abuts against the end portion 85 of tube 65. At its open end, bore 82 narrows to an opening corresponding with the cross section of tube 65. Socket tube 65 can slide in this opening. A compression spring 86 surrounds tube 65 between said opening and boss 83.

The axial movement of switching element 88 energizes the windshield wiper motor circuit. At the same time, ambient valve 59 is opened by stop 92 provided in the wall of the central bore of the switch body 88.

This stop 92 exerts a lifting action upon boss 93 of valve 59. Ambient air can penetrate to opening 64 of seat 58 and thus to the second portion 53 of the pumping chamber. This can be for example via an opening 98 (FIG. 7) that is located above the area covered by locking balls 97 and that extends to one of the grooves 94, 95 and 96. The latter communicate with space 54 and valve 59. As ambient air enters 53, the pump squirts washing liquid on the windshield of the automobile. As mentioned earlier, squirting ceases when recess 68 on diaphragm 48 begins to cooperate with projection 69 of the bottom wall of the pumping chamber. The windshield wiper motor will then remain in operation. Only when diaphragm 48 has practically completed its discharge stroke, and when the windings of spring 86 are fully compressed will the resistance of contact balls 89 and 90 against leaving groove 91 be overcome by spring 63. As soon as this resistance has been overcome, spring 86 moves switch body 55 with a snapping action back to the position shown in the drawing. The electric circuit for the windshield wipers is interrupted, and an electric circuit for returning the windshield wipers to their parking position is closed. The period of time during which the windshield wipers dry the windshield is dependent on the degree of restricted discharge of inlet valve 71 from pumping chamber 50.

The pump can perform the function of a conventional switch for operating the windshield wiper motor when control knob 87 is rotated. Such rotation does not open ambient air inlet valve 59, so that the pump does not deliver washing liquid. Switching element 88 is shaped so that the electric circuit for the windshield wiper motor is energized when the knob is rotated. When knob 87 is turned, spring-loaded locking balls 97 located in diametrically opposed radial bores of switch body 55 leave diametrically opposed axial grooves 94 in the inner wall of space 54 and successively snap into diametrically opposed grooves 95 and 96 respectively. They maintain switch body 55 in positions wherein various electric circuits, for operating the windshield wiper motor at various speeds, are completed through conductive element 88. Said element 88 is preferably of such configuration that the windshield wiper motor always operates at its maximum speed when knob 87 is pulled, irrespective of the position in which balls 97 engage grooves 94, 95 or 96 at the particular moment.

If the pump is to be used in an automobile whose windshield wiper motor has only one speed, grooves 95 are not needed, and the configuration of switching element 88 can be selected accordingly. Terminals 78, 79 and 80 are electrically insulated both from each other and from switching element 88. Both the part of pump housing 52 where terminals 78, 79 and 80 pass through its wall and switch body 55 are therefore preferably made of an electrically insulating material, such as plastic.

The embodiment shown in FIG. 8 differs from that in FIGS. 6 and 7 mainly in that the degree of restricted discharge through inlet valve 71 of pumping chamber 50 is adjustable. Furthermore, diaphragm 99 of the embodiment shown in FIG. 8 has a different shape, while ambient air inlet valve 100 and its seat 101 are of slightly different design. Diaphragm 99 is provided with an annular recess 103 extending over the full height of coaxial recess 102, surrounding wall 104 of the recess. This arrangement prevents transmission of any radial elongation of diaphragm 99 to recess 102, so that the latter retains its desired shape during the discharge stroke.

In FIG. 8, the degree of restricted discharge of inlet valve 71, and therefore the length of time during which the windshield wipers operate after delivery of washing liquid has stopped, can be set by adjustment of stop 105. This prevents valve 71 from fully sealing against its seat during the discharge stroke of diaphragm 99. Stop 105 can be adjusted by turning knob 106, which projects from the pump housing. Stop 105 is borne by a threaded rod 107 secured to knob 106, said rod being screwed into an opening in the pump housing ending in the duct for admitting washing liquid.

Instead of the pump having an ambient air inlet opening 98 of the type shown in FIG. 7, control rod 73 of the pump may have one or more axial grooves 108, as shown in FIG. 8. Ambient air can then reach the second portion of the pumping chamber via grooves 108, grooves 94, 95 or 96 (FIG. 7) and the opening of valve seat 64 (FIG. 6) or 113 (FIG. 8) when ambient air inlet valve 59 (FIG. 6) or 100 (FIG. 8) is opened. However, the construction shown in FIGS. 1–7 is an advantage in that the incoming ambient air is not forced to flow past the switch contacts, thus reducing the opportunities for air-borne dust to foul the switch contacts.

Figure 9:
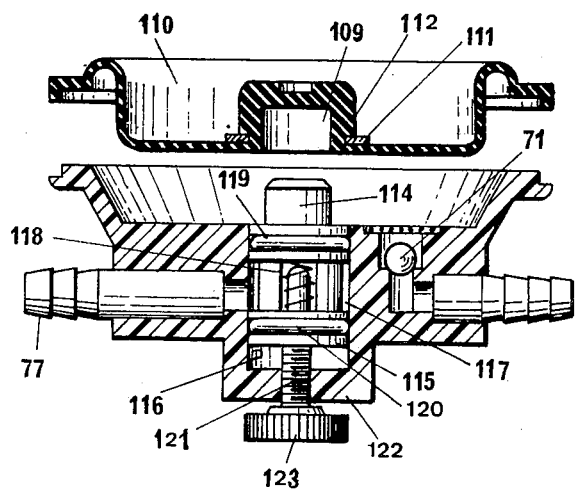
FIG. 9 is an exploded view of the elements adjusting the pumping period of a further embodiment of the pump in accordance with the invention.

In the embodiment shown in FIG. 9, enlargement of coaxial recess 109 in diaphragm 110 is prevented by a metal ring 111. It is confined in a circumferential groove at the base of the outside of cylindrical wall 112 located near the open end of recess 109. In this embodiment, the extent of projection of projection 114 towards recess 109 is adjustable. Thereby, one can control the position at which recess 109 and projection 114 contact one another and can as a consequence also control the period of time during which the windshield wipers are kept in operation after the squirting of washing liquid on to the windshield of the automobile has ceased.

The adjustability of projection 114 is provided by supporting it on a cylindrical member 115, slidably fitted in a coaxial bore 116 in the bottom wall of the pumping chamber. One side of the interior of slide member 115 is in open communication with the chamber of valve 70 and the other side with the duct of connecting nipple 77. For this purpose, member 115 is provided with an external circumferential groove 117. Its dimensions are such that it is permanently in open communication with the duct of connecting nipple 77. On the other hand, groove 117 is in open communication with the interior of the member 115 via one or several openings 118 in its wall. Member 115 has a sliding seal in bore 116, by means of two O-rings 119 and 120 located on either side of groove 117. Member 115 is fixed to threaded rod 121, which is screwed into the bottom 122 of bore 116, and has an adjusting knob 123 on its end, which projects from the pump housing. Rotation of knob 123 sets the extent to which projection 114 projects from bore 116 in the pumping chamber. When in the position shown in the drawing, in which projection 114 projects its maximum length into the pumping chamber, the time period during which the windshield wipers operate, after the squirting of washing liquid ceases, is at a maximum, assuming a given rate of restricted discharge through inlet valve 71 from the pumping chamber.

Figure 10:
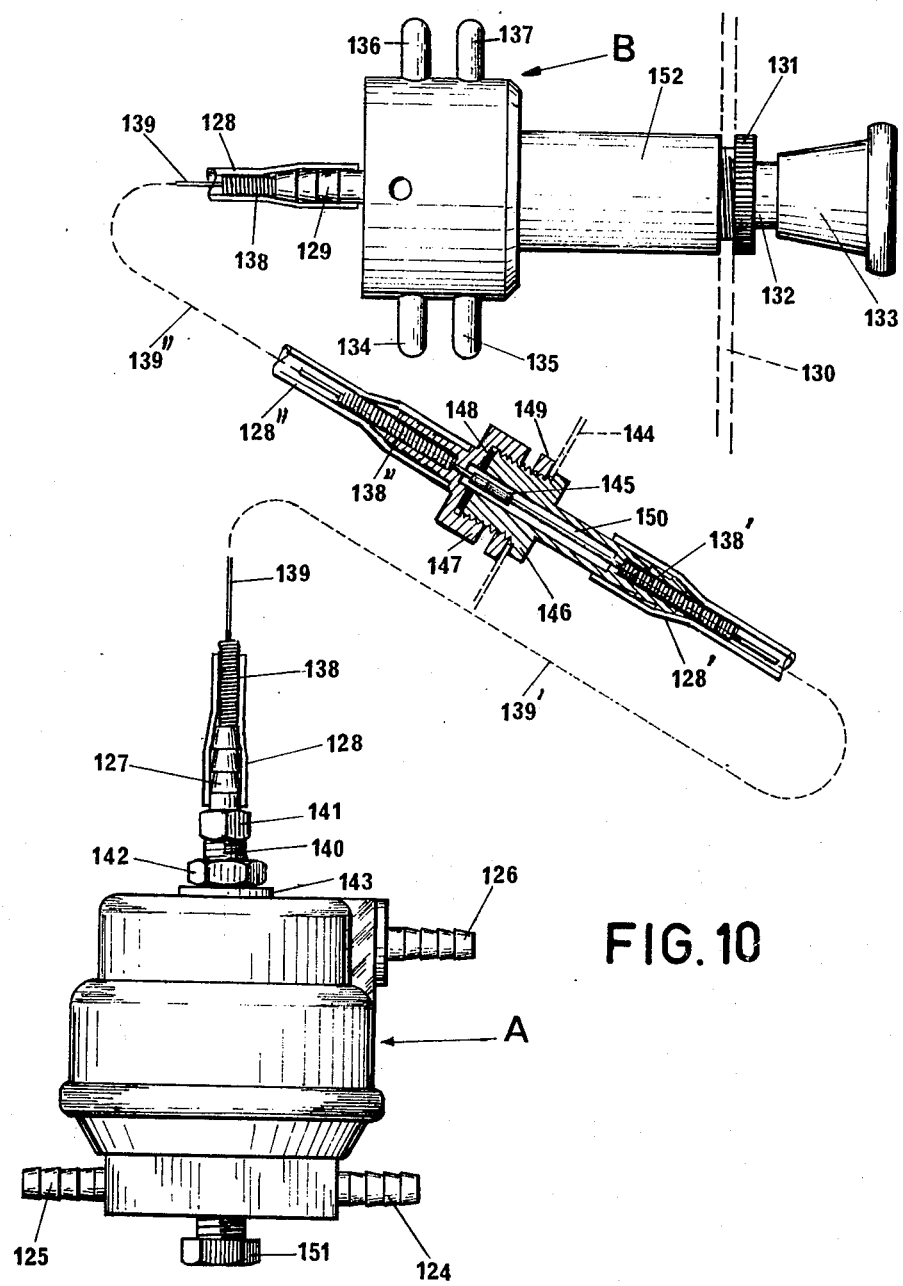
FIG. 10 is an elevational view of a pump in accordance with the invention and consisting of two separate parts connected by vacuum tubing shown in cross section.

In the embodiment of the pump shown in FIG. 10, there is a first part A of the pump containing the pumping member and forming the pump housing and the first and second portions of the pump chamber. It is provided with nipples 124 and 125 communicating with the first portion of the pumping chamber. These nipples are for connecting suction and delivery tubes (not shown) for the washing liquid. The second portion of the pumping chamber in part A contains a compression spring for effecting the discharge stroke of the pumping member. Said second portion communicates through a check valve (not shown) having a connecting nipple 126 and vacuum tube (not shown) with a source of sub-atmospheric pressure (not shown). The second portion of the pumping chamber is in open communication with connecting nipple 127, to which a vacuum tube 128 is connected. Its other end is connected to connecting nipple 129 of part B of the pump.

Part B contains the switch for operating the windshield wiper motor of a vehicle, the switch body of said switch being connected with the ambient air inlet valve which admits ambient air to vacuum tube 128 and from thence to the second portion of part A of the pump. Part B of the pump can for example be fitted within the driver's reach in an opening in instrument panel 130 by means of a bolt 131 with a central bore. Control rod 132 of the switch, which extends into this bore, bears control knob 133 at its end. When knob 133 is pulled outwardly, the valve in part B opens to admit ambient atmosphere to vacuum tube 128 and via said tube to the second portion of the pumping chamber, causing the pumping member to perform its discharge stroke as in the previous embodiments. At the same time the necessary connections between terminals 134–137 are made and/or broken to operate the electric windshield wiper motor. The internal arrangement of Part B may be the same as shown in the corresponding portions of FIGS. 1 and 2.

If nipples 124 and 125 are connected to a washing liquid supply receptacle and to the conventional nozzles fitted in front of the windshield of the motor vehicle, and nipple 126 of part A is connected to a source of sub-atmospheric pressure, the latter "primes" the pump. Pulling out knob 133 causes the squirting of washing liquid on to the windshield of the motor vehicle. At the same time, assuming the necessary electrical connections are made between terminals 134–137 and the terminals of the windshield wiper motor, the windshield wipers go into operation.

When one omits from the device that portion of the mechanism represented in the drawing as being fitted inside the vacuum tubing 128, connecting nipple 126 of part A and nipple 129 of part B, the windshield wipers will remain in operation after the pumping member has completed its discharge stroke. The driver himself has to depress knob 133 again if he thinks that the wipers have sufficiently dried the windshield. Depression of the knob 133 causes closure of the ambient air inlet valve contained in part B whereby suction from the source of sub-atmospheric pressure connected to part A of the pump will prime the pump again, making it ready for future squirting.

The portion of the mechanism inside vacuum tube 128 and nipples 127 and 129 is to eliminate the necessity of depressing knob 133. Thus, a Bowden cable with housing 138 surrounding thin steel wire 139 has been incorporated in the flexible vacuum tube 128 to make it non-compressible. Through the helical paths which exist in housing 138, ambient air admitted by the ambient air inlet valve of part B can reach the second portion of the pumping chamber in part A. The ends of Bowden cable housing 138 rest against nipples 127 and 129 respectively, while the steel wire 139 extends through the bore of nipples 127 and 129. The end of steel wire 139 extending into part A is secured to the central part of the pumping member. The end of steel wire 139 extending into part B is connected with lost motion to the ambient air inlet valve. Thus, although steel wire 139 moves in unison with the full discharge stroke of the pumping member, it closes the opened ambient air inlet valve and disengages the windshield wiper motor, only when the pumping member is nearing the end of its discharge stroke. The internal arrangement of part B may thus be the same as the related portions of FIGS. 4–9.

For adjustment of the period of wiper operation after termination of the squirting process, nipple 127 on part A can be provided with external screwthread and hexagonal shoulder 141. Screwing nipple 127 into the bore of part A increases said period and screwing nipple 127 out reduces said period. The nipple 127 can be locked in the desired position with the aid of locknut 142, which is tightened against packing ring 143.

If the vacuum tube 128 must pass through an opening, such as an opening in the bulkhead 144 separating the passenger compartment from the engine compartment of a motor vehicle, steel wire 139 may be in two parts 139' and 139'', connected by means of a coupling 145. Vacuum tube 128 and Bowden cable housing 138 each likewise are in two parts 128', 128'' and 138' and 138'' respectively. They are connected by means of a coupling, whose halves are indicated by 146 and 147, and which are screwed together and sealed by a packing ring 148. Coupling half 146 can be secured in an opening of wall 144 by means of a nut 149. Coupling 145 can move freely in an axial bore 150 of coupling 146, 147. Thus coupling 145 can follow the complete stroke of the pumping member of the pump without running against either of coupling halves 146, 147. In the drawing, coupling 145 is shown in the position which it occupies when the pump is primed, i.e. before the pumping member has executed its discharge stroke.

Number 151 indicates a bolt with which part A of the pump can be secured to a support. It is also possible, however, to use locknut 142 for this.

The check valve of part A, whose connecting nipple is indicated by 126, need not necessarily be fitted in part A. For example, vacuum tube 128 may be provided with a branch (not shown), for example with the aid of a tee fitting, said branch being connected to a source of sub-atmospheric pressure and the check valve being accommodated in said branch.

In the present embodiment, that portion of part B which houses the windshield wiper motor switch and the ambient air inlet valve is extended by means of extension tube 152 through which control rod 132 extends. This extension locates the bulkiest portion of part B further behind the instrument panel, leaving more room for other instruments beside tube 152.

In the embodiments of the pump described herein, after the automobile engine has been started, the pump remains primed as long as it has not been put into operation. When the automobile engine is switched off, and the absolute pressure in its intake manifold rises, a lower absolute pressure persists in the second portion of the pumping chamber. This is due to the closing of the check valve in the duct between said chamber portion and the intake manifold. If this check valve, or the ambient air inlet valve, does not seal completely, the spring which causes the discharge stroke of the pumping member will gradually slacken while the automobile engine is switched off, when the absolute pressure in said second portion exceeds the value necessary to keep said spring compressed. In practice this is not a problem. It has been found that the pressure which builds up in the washing liquid in the pumping chamber when the spring slowly slackens remains below the level required to open the spring-loaded outlet valve of said pumping chamber. In that case the washing liquid is gradually forced back into its storage receptacle via the incompletely sealed pumping chamber inlet valve, so that there is no unnecessary loss of washing liquid.

What is claimed is:

1. A windshield washer pump having a check-valve controlled suction duct suitable for connecting said pump to a vacuum source; such as the intake manifold of an internal combustion engine; said pump including a closed chamber having a pumping member dividing said chamber into first and second portions and moveable in said chamber for drawing washing liquid into and discharging the liquid from said first portion; said suction duct connecting with the interior of the second portion of said chamber for reducing the pressure therein and for actuating said pumping member to draw in and maintain said liquid in said second portion; said check valve communicating between said suction duct and the interior of the second chamber and having open and closed positions, said check valve also including closing means urging said check valve into closed position in response to increase of absolute pressure in said suction duct relative to the absolute pressure in the second portion of the pumping chamber, whereby washing fluid may be maintained in said pump despite fluctuations in available vacuum.

2. Apparatus in accordance with claim 1 including an ambient air inlet and inlet valve means communicating between the interior of said second portion and the exterior of said chamber for controllably admitting air to the second portion of the chamber.

3. Apparatus in accordance with claim 2 wherein the suction duct and check valve means have a greater combined resistance to the flow of air out of said second portion than the combined resistance which the ambient air inlet and inlet valve means have to the flow of air into the second portion of the chamber.

4. Apparatus in accordance with claim 1 wherein discharge urging means are provided for urging said pumping member to discharge the washing liquid from the first portion of the chamber.

5. Apparatus in accordance with claim 4 wherein said discharge urging means is a member which exerts force continuously upon the pumping member when the first portion of the chamber is filled with washing fluid.

6. Apparatus in accordance with claim 4 wherein said discharge urging means is a member which exerts force continuously upon the pumping member in all positions to which it is moveable.

7. Apparatus in accordance with claim 4 wherein said discharge urging means is a spring positioned to be compressed by the pumping member as it moves to draw in washing liquid.

8. An automotive windshield washer pump having a check valve controlled suction duct suitable for connecting said pump to the intake manifold of an automobile engine, as a source of vacuum; said pump including a closed chamber having a pumping member dividing the chamber into first and second portions and moveable in said chamber for drawing washing liquid into and discharging the liquid from said first portion; ambient air inlet valve means communicating between the interior of said second portion and the exterior of said chamber, and openable and closeable for controllably admitting air to the second portion of the chamber; said suction duct communicating with the interior of the second portion of the chamber for exhaustion of air therefrom thereby to reduce the pressure therein, to produce a differential pressure on opposite sides of said pumping member and to actuate said pumping member for drawing in and maintaining said liquid in said second portion while said ambient air inlet valve is in closed position; discharge urging means connected with the pumping member for exerting force thereon continuously in the direction of movement corresponding to discharge of fluid, said pumping member being engaged with wall means defining said chamber for retaining said differential pressure and restraining said pumping member against said discharging movement until said ambient air inlet valve means is opened; said check valve communicating between said suction duct and the interior of the second chamber, and having open and closed positions, said check valve further including closing means for urging said check valve into closed position in response to increase of absolute pressure in said suction duct relative to the absolute pressure in the second portion of the chamber, thereby to restrict loss of fluid from said first chamber when the engine intake manifold pressure fluctuates; said check valve and suction duct having a greater conbined resistance to the flow of air out of said second chamber than the combined resistance of the ambient air inlet and inlet valve means have to the flow of air into the second portion, thereby facilitating the entry of ambient air and the discharge motion of said pumping member.

9. Apparatus in accordance with claim 8 including means connecting said pumping member with said ambient air inlet valve for closing said valve when the discharge motion of said pumping member is substantially complete.

10. An automotive windshield washer pump having a check valve controlled suction duct connecting said pump to the intake manifold of an automobile engine, as a source of vacuum; said pump including a closed chamber having a flexible diaphragm dividing the chamber into first and second portions and moveable in said chamber for drawing washing liquid into and discharging the liquid from said first portion; ambient air inlet valve means communicating between the interior of said second portion and the exterior of said chamber, and openable and closeable for controllably admitting air to the second portion of the chamber; said suction duct communicating with the interior of the second portion of the chamber for exhaustion of air therefrom thereby to reduce the pressure therein, to produce a differential pressure on opposite sides of said diaphragm and to actuate said diaphragm for drawing in and maintaining said liquid in said second portion while said ambient air inlet valve is in closed position; spring means connected with the diaphragm for exerting force thereon continuously in the direction of movement corresponding to discharge of fluid, said diaphragm being engaged with wall means defining said chamber for retaining said differential pressure and restraining said diaphragm against said discharging movement until said ambient air inlet valve means is opened; said check valve communicating between said suction duct and the interior of the second chamber, and having open and closed positions, said check valve further including closing means for urging said check valve into closed position in response to increase of absolute pressure in said suction duct relative to the absolute pressure in the second portion of the chamber, thereby to restrict loss of fluid from said first chamber when the engine intake manifold pressure fluctuates; said check valve and suction duct having a greater combined resistance to the flow of air out of said second chamber than the combined resistance of the ambient air inlet and inlet valve means have to the flow of air into the second portion, thereby facilitating the entry of ambient air and the discharge motion of said diaphragm.

11. A suction operated windshield washer pump having a pumping chamber with an ambient air inlet valve means and a manual outward-pulling operating handle means which is connected to said valve means through a windshield wiper operating switch; said pump including a closed chamber having a pumping member dividing said chamber into first and second portions and moveable in said chamber for drawing washing liquid into and discharging the liquid from said first portion; a suction duct connecting with the interior of the second portion of said chamber for reducing the pressure therein and for actuating said pumping member to draw said liquid into said second portion; wall means defining an enclosure for said switch means; an ambient air inlet duct, controlled by said ambient air inlet valve means, connecting between the interior of the second portion of said chamber and the exterior thereof by a path which does not extend through said switch means.

12. Apparatus in accordance with claim 11 including check valve means communicating between said suction duct and the interior of the second portion of the pumping chamber and having opened and closed positions, said check valve also including closing means urging said check valve into closed position in response to increase of absolute pressure in said suction duct relative to the absolute pressure in the second portion of the pumping chamber.

13. Apparatus in accordance with claim 12 wherein the suction duct and check valve means have a greater combined resistance to the flow of air out of said second portion than the combined resistance which the ambient air inlet duct and inlet valve means have to the flow of air into the second portion of the chamber.

14. Apparatus in accordance with claim 11 wherein discharge urging means are provided for exerting force upon the pumping member to discharge washing fluid from the first portion of the chamber.

15. Apparatus in accordance with claim 14 wherein said discharge urging means is a member which exerts force continuously upon the pumping member in all positions to which it is moveable.

16. Apparatus in accordance with claim 14 wherein said discharge urging means is a spring positioned to be compressed by the pumping member as it moves to draw in washing liquid.

17. Apparatus in accordance with claim 11 wherein the ambient air inlet valve means is positioned at the opposite end of said windshield wiper switch means from the manual operating handle means.

18. Apparatus in accordance with claim 11 wherein the body of said windshield wiper switch means and said ambient air inlet valve means are a unitary assembly.

19. Apparatus in accordance with claim 11 including a rotary connection between said switch body and said ambient air inlet valve means whereby said switch body may be rotated independently of said valve means.

20. Apparatus in accordance with claim 11 wherein said manual operating handle means has longitudinally inward and outward positions for actuating said pump and said windshield wiper switch means and a plurality of rotational positions for operating only said windshield wiper switch means.

21. Apparatus in accordance with claim 11 wherein said windshield wiper operating switch means has a lost motion connection with said pumping member.

22. Apparatus in accordance with claim 11 wherein said windshield wiper operating switch means and said pumping member are each housed in separate housings and are interconnected by cable means.

23. Apparatus in accordance with claim 22 wherein said ambient air inlet valve means is in the same housing with said windshield wiper operating switch means, and said separate housings are interconnected by a vacuum tube.

24. In a suction-operated windshield washer pump of the type which includes in its housing windshield wiper switch means and ambient air inlet valve means, the improvement characterized in that the device has a manual operating handle means or knob with (a) longitudinally inward and outward positions for actuating said pump and said windshield wiper switch means and (b) a plurality of rotational positions for operating only said windshield wiper switch means.

25. Apparatus in accordance with claim 24 wherein a ball-thrust bearing is confined between the ambient air inlet valve means and either the windshield wiper switch body or the handle means for closing the valve and for maintaining a stationary seal between the valve and its seat even when the switch body is rotated about its axis.

26. Apparatus in accordance with claim 25 wherein both the ball-thrust bearing and the valve means are rotatably mounted in a bore which extends into the windshield wiper body or into the handle means.

27. Apparatus in accordance with claim 24 wherein the valve member includes an axial bore opening in the direction of the valve seat for confinement of means interconnecting the valve with a pumping member.

28. Apparatus in accordance with claim 24 including means for automatic closure of the valve as the pumping member reaches substantially the end of its discharge stroke.

* * * * *